United States Patent [19]

Francis et al.

[11] 4,043,936

[45] Aug. 23, 1977

[54] BIOLOGICAL DENITRIFICATION OF HIGH CONCENTRATION NITRATE WASTE

[75] Inventors: Chester W. Francis, Oak Ridge; Frank S. Brinkley, Knoxville, both of Tenn.

[73] Assignee: The United States of America as represented by United States Energy Research and Development Administration, Washington, D.C.

[21] Appl. No.: 660,903

[22] Filed: Feb. 24, 1976

[51] Int. Cl.² .............................................. G21F 9/18
[52] U.S. Cl. ................................ 252/301.1 W; 210/2; 210/11; 210/DIG. 28
[58] Field of Search ..................... 210/2, 11, DIG. 28; 252/301.1 W

[56] References Cited

U.S. PATENT DOCUMENTS

| 2,980,731 | 4/1961 | Alheritiere et al. | 260/488 |
| 3,829,377 | 8/1974 | Hashimoato | 210/DIG. 28 |
| 3,846,289 | 11/1974 | Jeris et al. | 210/DIG. 28 |

FOREIGN PATENT DOCUMENTS

| 2,338,853 | 2/1974 | Germany | 210/DIG. 28 |
| 847,640 | 9/1960 | United Kingdom | 210/DIG. 28 |

OTHER PUBLICATIONS

Climenhage, D. C. et al. "Biological Process for Nitrogen-BOD Removal at Maitland Works" Proc. Ont. Ind. Waste Conf., 1973, 20, pp. 85-98.
Collins, J. C. Ed. Radioactive Wastes, Their Treatment and Disposal E & F. N. Spon. Limited, London 1960 pp. 141-165.
Climenhage, D. C. "Biological Denitrification of Nylon Intermediates Waste Water" 22nd Canadian Chem. Eng. Conf. Sept. 17-20, 1972.

*Primary Examiner*—Benjamin R. Padgett
*Assistant Examiner*—Deborah L. Kyle
*Attorney, Agent, or Firm*—Dean E. Carlson; Stephen D. Hamel; John B. Hardaway

[57] ABSTRACT

Biological denitrification of nitrate solutions at concentrations of greater than one kilogram nitrate per cubic meter is accomplished anaerobically in an upflow column having as a packing material a support for denitrifying bacteria.

10 Claims, 2 Drawing Figures

BIOLOGICAL DENITRIFICATION OF HIGH CONCENTRATION NITRATE WASTE

BACKGROUND OF THE INVENTION

This invention was made in the course of, or under, a contract with the Energy Research and Development Administration. It relates generally to the art of denitrification and more particularly to the art of denitrifying waste solutions having high nitrate concentration.

Waste solutions containing high concentrations of nitrate and nitrite ions represent a serious threat to the ecological balances which exist in nature. Accelerated eutrophication of lakes and streams is often caused by discharging conventionally treated waste effluent into the surface waters because these wastes contain quantities of nitrogen and phosphorus which can promote excessive algae production. Aside from being a major nutrient for algae production, nitrogen in the form of ammonia is toxic to aquatic life and can react with chlorine to form chloramines which are toxic to certain fishes. Water for livestock is considered unsafe at nitrate nitrogen concentrations exceeding 10 ppm. These concentratins can cause methemoglopinemia, vitamin A diffficiency, loss of milk production, thyroid disturbances and reproductive difficulties. Nitrite wastes are considered to be injurious to several species of fish at concentrations on the order of 5 ppm nitrite nitrogen. Complete denitrification (conversion of nitrate or nitrite to elemental nitrogen gas) prior to releasing wastes to surface waters is thus desirable.

Considerable research has been conducted regarding the biological denitrification of low level nitrate and nitrite wastes such as that of municipal wastes and agricultural wastewaters. Such wastes seldom exceed 60 ppm nitrate nitrogen. In the past, units containing activated sludge having bacteria therein have been used for denitrifying such wastes. Such activated sludge units utilize dentrifying bacteria which are suspended by mixing with the wastewater. The mixture of activated sludge in the wastewater is then passed to a settling tank for separation of the final effluent in the activated sludge. The sludge which settles from the settling tank is normally recycled with the further wastes. Packed bed reactors have also been utilized for conventional denitrification using denitrifying bacteria. A packed bed denitrification unit is an enclosed reactor containing submerged inert packing material which provides surface area for bacterial growth. Packed bed systems are operated both aerobically and anaerobically under flooded conditions with either an upward or downward flow.

While the prior art units are satisfactory for handling the low nitrate concentration levels of minicipal and agricultural wastes, they have been found unsatisfactory for handling high concentrations of nitrate wastes. In fact very little effort has been directed towards removing nitrates from wasterwaters containing concentrations of nitrate nitrogen in excess of 1000 ppm. Wastewater streams containing this magnitude of nitrates are generated in fertilizer and explosive manufacturing operations. Large quantities of wastewater effluent containing high nitrate concentrations are generated in nuclear fuel processing operations and at uranium oxide fuel fabrication plants.

SUMMARY OF THE INVENTION

It is thus an object of this invention to provide a process for denitrifying high concentration nitrate wastes.

It is a further object of this invention to provide a process for biologically denitrifying high concentration nitrate wastes.

It is a still further object of this invention to provide a biological process for continuously denitrifying high concentration nitrate wastes.

It is a still further object of this invention to provide a process of preparing a microbial culture for use in such a denitrification process.

These as well as other objects are accomplished by continuously passing high concentration nitrate wastes in an unflow mode anaerobically through a packed column containing denitrifying bacteria. The denitrifying bacteria are provided by incubating soil bacteria anaerobically with a carbon souce in the presence of a high nitrate concentration.

DETAILED DESCRIPTION OF THE DRAWINGS

Figure 1:
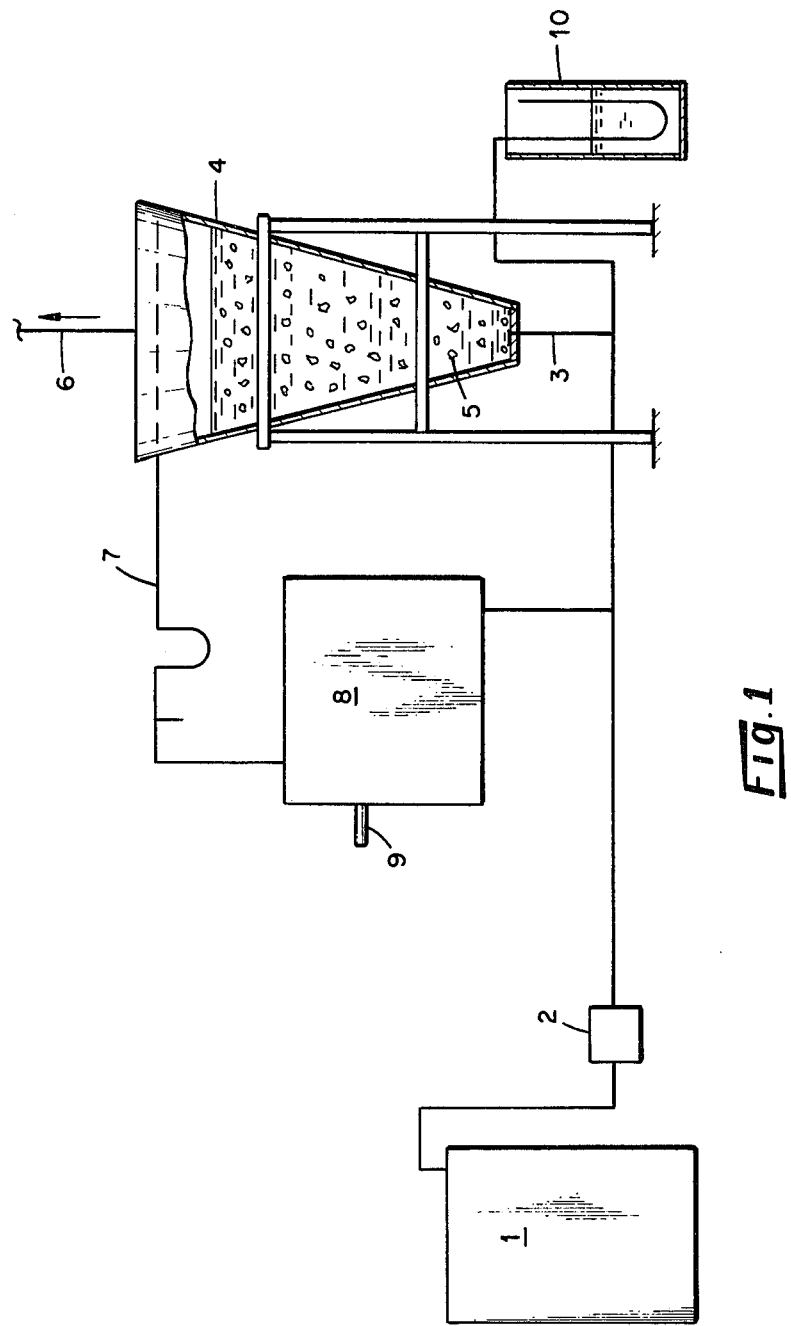
FIG. 1 illustrates schematically the apparatus used in carrying out the process of this invention.

In accordance with this invention it has been found that high concentration nitrate wastes can be effectively denitrified by passing the waste with a source of carbon continuously in an upflow mode through a column packed with a support having attached thereto denitrifying bacteria. The nitrate waste, under the influence of the denitrifying bacteria attached to the column packing, is converted along with the carbon source to free nitrogen and carbon dioxide. While a cylindrical column can be used to carry out the process of this invention, a conical column is preferably utilized because of the support stability and greatly enhanced denitrification rates.

As used within this disclosure the term high concentration nitrate waste is used to refer to waste containing at least about 1 kilogram of nitrate per cubic meter of aqueous phase or about 1000 ppm nitrate. The process of this invention is similarly applicable to dentrifying nitrite wastes at concentrations of 1 kilogram per cubic meter.

Included within the scope of this invention is a process of preparing a column for biological denitrification. It is essential to the dentrification process of this invention that the process of column preparations as taught herein be carried out. Column preparation requires an incubation step wherein a mixture of denetrifying bacteria is allowed to grow to a population size sufficient to carry out the denitrification process. The bacteria incubation step may be carried out either within the column which eventually will be utilized for denitrification or as a separate step in a separate container. If a separate container is used for carrying out the incubation step, the bacteria are later applied to the column packing. Thus, as an essential part of the process of this invention a mixed culture of the dentrifying bacteria are incubated at a nitrate concentration near that of the nitrate waste to be denitrified, i.e., incubated at anitrate concentration of at least about 750 grams of nitrate per cubic meter. If the column is not incubated with a mixed culture so as to allow preferential growth of strains which will denitrify high concentration waste, there will be an insufficient population of appropriate strains to respond when contacted with such waste. The use of a wide range of denitrifying bacteria adds stability and adaptability to the system. Such adaptability is not possible with a monoculture of a single bacterium specie. If the system is not incubated under conditions of high nitrate concentrations and with an appropriate carbon source, the ultimate denitrification system will simply allows the influent of high nitrate concentration waste to pass through without denitrification.

While not as essential as the correct nitrate concentration, the carbon source present in the incubation solution should preferably be the same as that intended for use with the waste stream. If a different carbon source is used, there will likely be a lag from the time a waste solution and carbon source are introduced into the column and the time at which the denitrifying bacteria acclimatize to the different carbon source.

The growth and, therefore the response, of the desired strains of bacteria in the incubation step can be detected visually by observing an increase in the volume of the biomass present in the incubation container. As previously mentioned the incubation container may be either the column intended for eventual use or a separate anaerobic environment such as a glass vessel or carboy.

The use of a mixed denitrifying culture and incubation as taught herein is essential to the utility of the ultimate dentirification system. Such mixed culture of denitrifying bacteria are found in a soil of medium pH (6.5 to 7.5) and high organic content, e.g., from 2 to 5 wt. %. A sample of such a culture incubated in accordance with the process of this invention and as described in Example IV is deposited with the American Type Culture Collection, 12301 Park Lawn Drive, Rockville, Maryland 20852 and given ATCC No. 31190 on Jan. 16, 1976. While the complete taxonomic description of the strain produced in accordance with the above procedure is not known, the denitrifying bacteria are believed to belong to the genus Pseudomonas.

The dentrification process of this invention may be best understood by referring to FIG. 1 of the drawings which illustrates in schematic form the preferred apparatus for carrying out the process. A source of nitrate waste 1 is pumped by pump 2 to the bottom inlet 3 of conical column 4. The column is packed with a packing 5 having attached thereto denitrifying bacteria. While within the column, the nitrate is denitrified as the carbon source is metabolized by the denitrifying bacteria to produce elemental nitrogen gas and $CO_2$ gas. The product gases pass through exit 6. The effluent aqueous stream being substantially free of nitrogen overflows through outlet 7. As a preferred embodiment of this invention the apparatus also contains a means 8 for periodically recycling a portion of the effluent solution back to the bottom of column 4 through inlet 3 to pulse the column, freeing the packing 5 of excess elemental nitrogen gas and $CO_2$ thus increasing the hydraulic residence time in the column. The head maintained within the column is continuously monitored by means of manometer 10.

The ultimate source of high concentration nitrate wastes to be treated by the process of this invention will normally be in the form of nitric acid such as that found in fertilizer and nuclear process facilates. These wastes are normally neutralized prior to carrying out conventional disposal techniques. In accordance with this invention it is preferred to neutralize such acid wastes to a pH within the range of 6.4 to 7.0. This neutralization step is necessary to prevent exposing the bacteria to the acidic waste which will ultimately result in the death of the bacteria. While $Ca(OH)_3$ or $CaCO_3$ are the preferred bases for neutralizing the acidic waste the following bases may also be used to neutralize acidic wastes: $NH_4OH$, $NaOH$ and $KOH$. When $CaCO_3$ or $Ca(OH)_2$ are used, $CaCO_3$ will be formed in the formed in the column. As long as the packing bed is periodically agitated solidification of the packing with $CaCO_3$ concretions is not a problem.

The process of this invention is thus applicable to nitrate wates containing a concentration of nitrate within the range of 1 gram to about 15 kilograms per cubic meter and having a pH within the range of 5.5 to 9.0. The process operates optimally at concentrations within the range of 1 kilogram to 5 kilograms of nitrate per cubic meter and at a pH within the range of 6.4 to 7.0. Below pH 5.5 and above pH 9.0 biological denitrification proceeds very slowly. Its optimum pH range is 6.5 to 8.5. Thus, to ensure the most effective denitrification rates in a unit the influent pH should be at or near the lower pH value (6.5) as the pH increases during denitrification.

The packing material to which the denitrifying bacteria is attached is preferably anthracite coal particles having an effective diameter within the range of 2 to 3 mm. However, other packing such as polypropylene or ceramic rings or saddles may be used. Coal is preferred because its density (2.3 to 2.5 g/cm$^3$) allows the packing to act as a fluidized bed under maximum denitrification conditions in a conically shaped column. A small sample of stock culture of bacteria can be used to incubate a column for use in the process of this invention. Fresh soil (preferably a soil of medium pH and high organic content - 2 to 5% C) containing the bacteria is added to a solution of calcium nitrate containing approximately 1000 grams of nitrate per cubic meter and 600 grams of methanol per cubic meter. The stock culture is allowed to grow anaerobically for a period of from 10 to 20 days with stirring every three to four days. This procedure produces a healthy culture of denitrifying bacteria. Column units are seeded with the above culture by recycling a solution containing the microorganisms, calcium nitrate and methanol. Preferably such a solution comprises about 0.006 molar calcium nitrate aqueous solution having about 600 grams of methanol per cubic meter. This solution is recycled through the column until a microbial population is established on the packing media. Generally about 1 to 2 weeks are required to establish a culture in a packed column.

Since the denitrifying bacteria require a carbon substrate to denitrify nitrate to elemental nitrogen gas as well as use for cell synthesis, a source of carbon must be provided along with the aqueous nitrate source. Many sources of carbon may be used in carrying out the process of this invention. Such carbon source may be a compound selected from the group consisting of glucose, malate, methanol, acetone, ethanol, acetate (neutralized acetic acid) or any other carbon source possessing a high biological oxygen demand (BOD). Methanol, however, is the preferred substrate for use in the process of this invention because of its availability and costs. Methanol is metabolized in accordance with the following reaction:

$$5CH_3OH + 6NO_3^- \rightarrow 5CO_2 + 3N_2 + 7H_2O + 6OH^-$$

A similar type reaction occurs when other substrates are used. Stoichiometrically 0.43 grams of methanol are required to denitrify one gram of nitrate. However, this does not provide sufficient carbon for microbial growth or deoxygenation of any dissolved oxygen present in the system. In the high nitrate concentration range practiced by this invention about 0.45 to 0.50 grams of methanol are required per gram of nitrate. The closeness of the actual carbon requirement and the stoichiometric requirement is quite surprising in view of the above considerations. A possible explanation of this phenomenon is that denitrification at high nitrate concentrations produces a higher microbial build-up in the reactor than is produced at low nitrate concentratins. Thus a portion of the carbon requirement may be supplied by an endogeneous carbon source rather than the added methanol. Additionally, at high nitrate concentrations a greater proportion of the microbial enzyme is in the active form than at low nitrate concentrations. Thus at low nitrate concentrations methanol must be utilized to support both a free and acitve form of bacteria.

In carrying out the process of this invention a satisfactory resident time for the reactants in contact with the bacteria must be selected. This is dependent upon both the volume of the column through which the reactants flow and the flow rate of the reactants. The maximum denitrification rates achieved using a conical column packed with anthracite coal has been about 1.2 to 1.4 grams of nitrate per second per cubic meter of initial anthracite coal packing. Because hydraulic residence time and bacteria are variable and difficult to determine accurately, rates of denitrification are most easily expressed in these terms. Denitrification kinetic data indicates that denitrification rates decrease at nitrate concentrations greater than about 5 kilograms of nitrate per cubic meter of solution. Thus, an appropriate size reactor can be computed by using 5 kilograms of nitrate per cubic meter of solution as a maximum influent concentration. A reactor volume (initial bed packing) capable of handling the required or desired removal rate of nitrate based on the 1.2 to 1.4 grams of nitrate per cubic meter per second should be used in computing column size. The cross-sectional flow rate at the base of the conical column should be maintained at less than 2.3 dm$^3$/m$^2$/s. For example, to denitrify 5 metric tons of nitrate a day a volume of 10$^3$m$^3$ of nitrate solution could be pumped at a flow rate of 11.6 dm$^3$/s into a conical column containing approximately 58 cubic meters of packing.

A great and unexpected advantage of the process of this invention is that trace elements which are present in the nitrate wastes are somehow retained within the column such that the wastes which are released to the environment are free of or appreciably reduced in the concentration of these metal ions. For example, ammonium nitrate solutions containing five to ten grams of uranium per cubic meter was lowered to less than 0.5 grams per cubic meter in one pass through a column packed with 11.12 cubic decimeters of anthracite coal. Zinc, copper, cadmium, and plutonium will be similarly retained within the column. The exact reason for this retention within the column is unknown. However, it is believed that these cations are precipitated as carbonates or converted to insoluble phosphate minerals similar to apatite.

Having generally described the progress of this invention the following specific examples are given as a further aid to the understanding thereof.

EXAMPLE I

An apparatus similar to that shown in the figure of drawings was used in carrying out this example. A tapered column constructed of "Plexiglass" and having a total included angle of 0.46 radians was used. The column had a total height of 117 centimeters and was filled with 32.5 cubic decimeters of anthracite coal which came to a height of 73.6 centimeters within the column. The anthracite coal was obtained from Shamoking Filter Company, Shamoking, Pennsylvania and was identified as "Filt-O-Cite 1.5". This packing material had an effective diameter of between 2 and 3 millimeters. Particles were angular and irregularly shaped and had an average particle density of about 1500 kilograms per cubic meter. Bed porosity after placement in the column was about 36%. The packing was then innoculated with a microbial stock culture obtained from soil.

Figure 2:
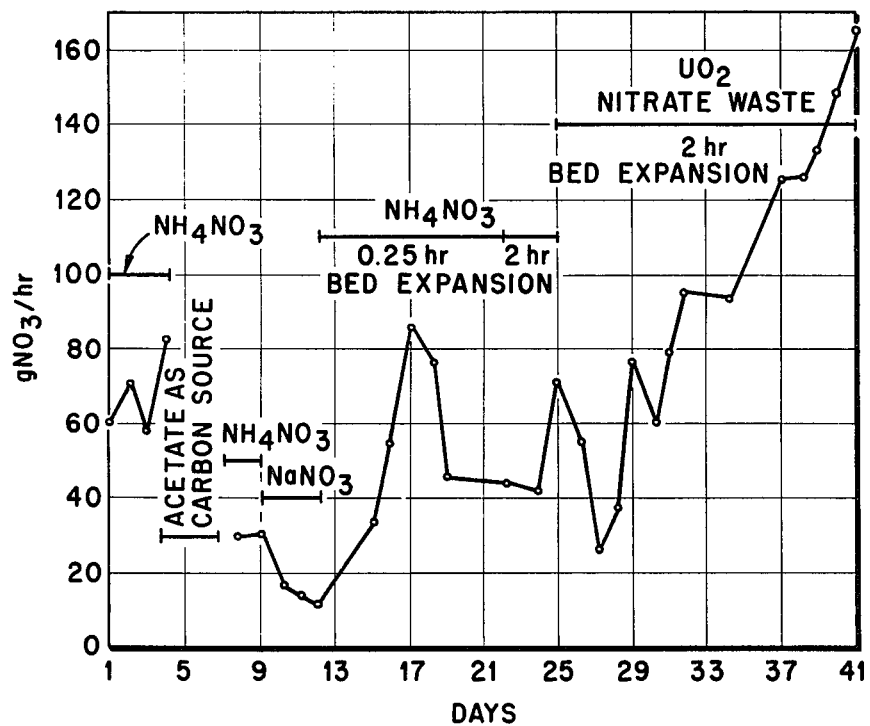
FIG. 2 graphically depicts the denitrification rate achieved in the experiments set forth in Example I.

The original stock culture was obtained in the following manner. Approximately 10 grams of a soil from an organic horizon of an Emory silt loam on the Oak Ridge National Laboratory Reservation were added to 8 cubic decimeters of calcium nitrate solution containing approximately 1 kilogram of nitrate per cubic meter and 600 grams of methanol per cubic meter. The solution was contained in a hermetically sealed glass vessel. Anaerobic conditions and occasional stirring every three to four days produced a healthy culture of denitrifiers after 10 to 20 days. Column units were seeded by recycling 80 cubic decimeters of calcium nitrate solution contaning approximately 1 kilogram nitrate per cubic meter, 600 grams methanol per cubic meter and 2 to 3 cubic decimeters of the active culture of denitrifiers. Recycling continued until a microbial population was established on the packing media. Subsequently, nitrate feed containing 0.6 grams methanol per gram of nitate was passed slowly (0.17 to 0.80 cubic centimeters per second) through the column. Influent solutions were made with spring water and in addition to the nitrate and carbon substrate contained the following in moles per liter to assure that all essential nutrients were available for microbial growth:

$3.2 \times 10^{-4} KH_2PO_4$, $7.7 \times 10^{-4}$ $MgSO_4$, $2.75 \times 10^{-5} FeCl_3.6H_2O$, and $4.13 \times 10^{-7} NaMoO_4.2H_2O$ The experiment was carried out utilizing solutions made from three nitrate salts, i.e., calcium nitrate, sodium nitrate and ammonium nitrate and actual nitrate wastes from a uranium oxide fuel fabrication plant. Denitrification performance was measured over a 41 day period. Data from this test is illustrated in FIG. 2 of the drawinng as denitrification rate and in Table I below.

Table I

| Time Days | NO$_3$ Influent kg/m$^3$ | NO$_3$ Effluent kg/m$^3$ | Flow Rate cm$^3$/s | Denitrification Rate[1] g NO$_3$/m$^3$/s |
|---|---|---|---|---|
| | Influent containing NH$_4$NO$_3$ | | | |
| 1 | 4.87 | 0.36 | 3.68 | 0.51 |
| 2 | 7.53 | 2.21 | 3.67 | 0.60 |
| 3 | 8.86 | 5.09 | 4.81 | 0.50 |
| 4 | 12.8 | 7.31 | 4.11 | 0.70 |

Table I-continued

| Time Days | NO$_3$ Influent kg/m$^3$ | Effluent kg/m$^3$ | Flow Rate cm$^3$/s | Denitrification Rate[1] g NO$_3$/m$^3$/s |
|---|---|---|---|---|
| Acetate used as carbon source | | | | |
| 8 | 22.1 | 15.5 | 1.22 | 0.25 |
| 9 | 22.1 | 15.5 | 1.25 | 0.26 |
| Influent containing NaNO$_3$ | | | | |
| 10 | 23.0 | 19.5 | 1.33 | 0.14 |
| 11 | 20.4 | 17.7 | 1.33 | 0.11 |
| 12 | 17.7 | 15.9 | 1.33 | 0.07 |
| Influent containing NH$_4$NO$_3$ With bed expansion every 0.25 hour | | | | |
| 15 | 7.31 | 3.19 | 2.25 | 0.28 |
| 16 | 7.75 | 1.02 | 2.25 | 0.46 |
| 17 | 12.0 | 0.55 | 2.13 | 0.75 |
| 18 | 15.5 | 7.75 | 2.68 | 0.64 |
| 19 | 12.8 | 8.19 | 2.68 | 0.38 |
| With bed expansion every 2 hours | | | | |
| 22 | 10.2 | 4.21 | 2.07 | 0.38 |
| 24 | 7.53 | 2.66 | 2.42 | 0.36 |
| 25 | 15.5 | 2.97 | 1.55 | 0.60 |
| UO$_2$ fuel nitrate waste With bed expansion every 2 hours | | | | |
| 26 | 11.1 | 2.57 | 1.75 | 0.46 |
| 27 | 7.97 | 5.31 | 2.75 | 0.22 |
| 28 | 10.1 | 3.10 | 1.47 | 0.32 |
| 29 | 12.8 | 3.10 | 2.23 | 0.67 |
| 30 | 12.2 | 5.53 | 2.55 | 0.52 |
| 31 | 13.7 | 5.31 | 2.60 | 0.67 |
| 32 | 13.3 | 3.10 | 2.57 | 0.80 |
| 34 | 22.1 | 11.9 | 2.52 | 0.79 |
| 37 | 15.9 | 8.6 | 4.68 | 1.05 |
| 38 | 11.5 | 4.43 | 4.87 | 1.06 |
| 39 | 12.4 | 4.43 | 4.55 | 1.11 |
| 40 | 12.4 | 3.81 | 4.48 | 1.18 |
| 41 | 15.5 | 5.31 | 4.5 | 1.41 |

[1]Denitrification rate based on initial volume of packing medium, 32.5 dm$^3$. Nitrite measurements were not routinely made; however, random effluent samples of NH$_4$NO$_3$ and UO$_2$ fuel nitrate wastes did not reveal any concentrations greater than 10 g NO$_2$/m$^3$.

During days 1 through 4 ammonium nitrate was the nitrate source and methanol was utilized as the carbon source. On the fifth day an influent containing 11.1 kilograms of nitrate per cubic meter and acetic acid neutralized with sodium hydroxide equivalent in terms of carbon to 0.6 grams methanol per gram of nitrate was fed to the unit at 3.73 cubic meters per second; influent pH was 7.35. The following day nitrate analysis of the influent and effluent and the observation that there was no difference between the temperature of the two streams indicated that denitrification had ceased. To avoid loss of the established microbial population, methanol was replaced as the carbon substrate. Nitrate analysis on the eigth and ninth day verified that denitrification had resumed but at a much lower rate. However, the high influent nitrate concentration may have been partially responsible for low rates. Switching to sodium nitrate as a nitrate source reduced the denitrification after three days. The reduction was due either to continued exposure to nitrate concentrations greater than 15 kilograms nitrate per cubic meter or to some specific effect associated with sodium nitrate.

Taking into consideration the large quantities of nitrate detected in sodium nitrate effluents, the reduction in denitrification rate was likely due to the inability of the microorganisms to quickly acclimatize to sodium nitrate. For example, a similar, but not as severe reduction in denitrification was noted on the substitution of UO$_2$ fuel and nitrate wastes (predominately ammonium nitrate and nitric acid neutralized to pH 6.4) for ammonium nitrate on the 26th and 27th days. The difference between these nitrate sources was rather subtle, i.e., the ratio of nitrate to ammonium in the UO$_2$ nitrate wastes was 5 to 1 rather than 3.4 to 1 as in ammonium nitrate and the influent concentration of calcium after dilution with spring water was about 600 grams per cubic meter compared to less than 20 grams per cubic meter for ammonium nitrate influent. Even so, acclimatization for approximately three days was required before similar denitrification rates were attained. This illustrates the need for the incubation in accordance with this invention.

Through the walls of the column it could be observed that a large number of pores in the anthracite bed were filled with gas rather than nitrate solution, indicating that the packing material was not being utilized efficiently. On the 15th day, to maximize bed efficiency, the bed was expanded by pumping for thirty seconds approximately 5 cubic decimeters of effluent from a sump every quarter hour at the rate of about 167 cm$^3$/s. This procedure agitated the packing medium so that the gaseous denitrification products were discharged, thus increasing the hydraulic residence time of fresh influent into the column. Bed expansion in this fashion was carried out every quarter hour until the 22nd day when visual observations and a sharp decline in rate of denitrification indicated that microorganisms were being washed from the column faster than they were being produced. On the 23rd day, bed expansion was changed to every two hours. Gaseous discharge during bed expansion was quite high; as great as two cubic decimeters. At the termination of the experiment, denitrification rates were established in excess of one gram of nitrate per cubic meter per second. These rates are ten to fifteen times higher than those reported in the prior art systems for a continuous denitrification process. This denitrification rate also represents a rate which is two to five times the rate obtained in a cylindrical column without a conical shape. The increase over the rate produced in a cylindrical column is greatly surprising and an unexpected advantage over such technique. The major advantage of a conical column is that higher influent flow rates can be delivered to the columns without the packing floating to the top of the column and thus resulting in packing and high head pressures.

The primary gaseous products of denitrificaton are elemental nitrogen and carbon dioxide. The gaseous discharge from the conical column packed with anthracite coal and fed with UO$_2$ fuel fabrication wastes was approximately 92% N$_2$ and 8% CO$_2$ as shown in Table II which represents random samples taken during the use of UO$_2$ waste.

Table II

| Sample | Gas | | | | | |
|---|---|---|---|---|---|---|
| | N$_2$ | CO$_2$ | O$_2$ | NO | Ar | MeOH |
| | % by volume | | | | | |
| 1 | 95.42 | 4.54 | 0.008 | 0.01 | 0.03 | 0.002 |
| 2 | 90.36 | 9.42 | 0.0084 | 0.02 | 0.06 | 0.09 |
| 3 | 90.63 | 9.01 | 0.02 | 0.09 | 0.008 | 0.15 |
| 4 | 92.39 | 7.40 | 0.07 | 0.008 | 0.02 | 0.06 |
| 5 | 92.24 | 7.58 | 0.03 | 0.02 | 0.007 | 0.05 |
| Average | 92.21 | 7.59 | 0.027 | 0.03 | 0.025 | 0.07 |
| S.D. | 2.02 | 1.92 | 0.026 | 0.03 | 0.021 | 0.05 |

Considering the stoichiometric ratio of carbon dioxide to nitrogen dioxide, the concentration of CO$_2$ in the gaseous discharge was extremely low. However, the pH of the effluent was approximately 8.2 as shown in Table III; therefore, the bulk of the carbon leaves the reactor in the form of HCO$_3^-$ and CO$_3^{-2}$. Some carbon left the reactor in the form of microbial solids. Values for mixed liquor volatiles suspended solids in the effluents ranged from 100 to 900 grams per cubic meter.

Carbon was also retained inside the reactor as carbonates and microbial carbon.

Table III

| Nitrate Form | pH Influent | pH Effluent | Number of Observations |
|---|---|---|---|
| Ca(NO$_3$)$_2$ | 7.15 ± 0.09[1] | 7.62 ± 0.21 | 8 |
| NaNO$_3$ | 7.46 ± 0.75 | 8.55 ± 0.76 | 20 |
| NH$_4$NO$_3$ | 6.86 ± 0.09 | 8.25 ± 0.16 | 13 |
| UO$_2$ Nitrate Wastes | 6.93 ± 0.13 | 8.23 ± 0.13 | 10 |

[1]Standard deviation

The exothermicity of denitrification was observed during this experiment. The difference between the influent (295° K) and effluent (307° K) on the 39th day was 12°. At a flow rate of 4.55 cubic centimeters per second and assuming a density of water of 1 kilogram per cubic meter with a specific heat of 4.48 joules per gram per degree K, the rate of energy required to raise the influent to 307° K would be 228 joules per second. Presumably, this heat is generated by the oxidation of methanol. From the observed rate of heat generation a large denitrification unit, one capable of denitrifying five metric tons of nitrate daily and operating at this efficiency would generate considerable energy, e.g., 54.6 × 10$^6$ BTUs. Quite likely the heat loss in such a larger unit would be much less, which means the heat generated may limit the rate of denitrification. Thus, it appears that some type of cooling will be necessary with the larger units.

EXAMPLE II

The column utilized in the carrying out of Example I was also utilized to denitrify nitrate from a UO$_2$ fuel fabrication plant in the form of calcium nitrate. The nitrogen content of the influent in this example was generally within the range of about 7 to 8 Kg NO$_3$/m$^3$. However, about 99% of the calcium was removed from the influent stream which contained about 1000 grams per cubic meter of calcium. Elements other than calcium were also removed. It was observed that phosphorus, zinc, nickel, copper and cadmium were removed from the waste stream by the packed column. These observations are summarized in Table IV below.

Table IV

| Element | Concentration Influent g/m$^3$ | Concentration Effluent g/m$^3$ | Removal % |
|---|---|---|---|
| Calcium | 645 | 7.0 | 99 |
|  | 792 | 4.6 | 99 |
|  | 615 | 5.7 | 99 |
| Phosphorus | 3.0 | 1.3 | 57 |
|  | 5.1 | 0.52 | 90 |
|  | 7.1 | 1.2 | 83 |
| Zinc | 0.15 | <0.005 | >96 |
| Nickel | 0.30 | <0.1 | >55 |
| Copper | 0.20 | 0.035 | 82 |
| Cadmium | 0.06 | <0.005 | >91 |

EXAMPLE III

A cylindrical glass column, 120 by 15 cm diameter, was packed with polypropylene raschig rings, Flexirings, obtained from Koch Engineering Company, Wichita, Kansas. The rings were 1.6 × 1.6 cm diameter and had a geometric surface of 3.2 m$^2$/m$^3$ and a free space of 92%. The units were inoculated with microbial denitrifiers by recycling 80 dm$^3$ of Ca(NO$_3$)$_2$ solution containing approximately 1000 g NO$_3$/m$^3$, 600 g CH$_3$OH/m$^3$, and 2 to 3 dm$^3$ of an active culture of denitrifiers. Microbial populations were established faster on the polypropylene rings than on anthracite coal packing, viz., less than two weeks on polypropylene as compared to three to four weeks on coal. Maximum denitrification rates based on initial bed size were similar (1 to 1.2 g of nitrate per cubic meter per second). However, after prolonged operation, greater than forty days, denitrification rates began to decrease to 0.3 to 0.7 g nitrate per cubic meter per second after 50 to 60 days. These results are summarized in Table V.

Table V

| Time Days | NO$_3$ Influent kg/m$^3$ | NO$_3$ Effluent kg/m$^3$ | Flow Rate cm$^3$/s | Denitrification Rate[1] mg NO$_3$/m$^3$/s |
|---|---|---|---|---|
| 10 | 2.43 | 0.71 | 0.73 | 54 |
| 11 | 2.21 | 1.20 | 0.26 | 11 |
| 12 | 2.21 | 1.33 | 0.73 | 28 |
| 13 | 2.08 | 0.95 | 0.57 | 27 |
| 14 | 3.10 | 1.20 | 0.80 | 65 |
| 15 | 2.21 | 0.93 | 0.82 | 45 |
| 16 | 2.74 | 0.75 | 0.83 | 71 |
| 17 | 2.30 | 0.55 | 1.01 | 76 |
| 18 | 2.26 | 0.06 | 0.75 | 70 |
| 19 | 2.21 | <0.05 | 1.02 | >97 |
| 20 | 2.61 | <0.05 | 1.86 | >209 |
| 22 | 2.26 | <0.05 | 2.73 | >265 |
| 23 | 3.19 | <0.05 | 5.37 | >737 |
| 24 | 3.10 | 0.82 | 5.30 | 520 |
| 25 | 3.45 | 0.66 | 5.23 | 629 |
| 27 | 2.66 | <0.05 | 5.20 | >585 |
| 31 | 2.83 | 0.56 | 5.15 | 503 |
| 36 | 4.87 | <0.05 | 4.78 | >998 |
| 37 | 5.09 | 0.16 | 5.92 | 1260 |
| 38 | 5.31 | 0.93 | 5.33 | 1000 |
| 41 | 4.98 | 0.80 | 5.17 | 930 |
| 42 | 4.65 | 0.83 | 5.20 | 856 |
| 43 | 5.53 | 0.74 | 5.17 | 1070 |
| 45 | 4.03 | 1.90 | 5.22 | 477 |
| 46 | 4.43 | 2.26 | 5.17 | 483 |
| 47 | 4.21 | 2.79 | 5.17 | 315 |
| 49 | 5.53 | 3.32 | 4.12 | 392 |
| 52 | 5.53 | 3.50 | 5.37 | 471 |
| 56 | 5.20 | 2.21 | 5.07 | 652 |
| 57 | 3.59 | 2.43 | 5.00 | 247 |

[1]Denitrification rate based on initial bed volume, 23.2 dm$^3$.

The reduction in denitrification rates was attributed to hydraulic short circuiting in the column due to excessive microbial growth. For instance, after thirty to 35 days areas of dark colored microorganisms were observed in the lower portion of the column. Healthy denitrifiers are pink in color and they rapidly turn black if they do not receive a sufficient supply of nitrate. Initially, the dark colored organisms were suspected to be sulphate reducing microorganisms even though no evidence of H$_2$S could be detected. Sulphate concentration in the influent was reduced by a factor of 10 but the dark colored areas continued to grow. On the 45th day the column was flushed for 0.33 hours at a flow rate of 115 cubic centimeters per second. Visual observation of the effluent and the microbial mass in the column indicated that little biomass had been removed. Denitrification rates the following ten days were not appreciably changed. At the end of the experiment, mixed liquor suspended solids were 28.7, 37.6 and 83 kilograms per cubic meter, respectively, at the top, center and bottom of the column. With the 1.6 centimeter diameter polypropylene ring, microbial growth fills the center of the ring and reduces the surface area exposed to nitrate solution. This suggests that larger diameter rings would be more effective for long term use.

EXAMPLE IV

Denitrifying cultures were prepared in the following manner: Twenty grams of soil (taken from the top 10 cm of an Emory silt loam located on the Oak Ridge National Laboratory reservation), 10 gram of $NH_4NO_3$, 10 ml of $CH_3OH$ and 0.1 gram of $KH_2PO_4$ were added to eight liters of distilled water in a glass carboy. The carboy was made anaerobic using a single hole No. 10 ½ rubber stopper to which a tygon tubing was connected at one end and submerged in water at the other end. In this manner, oxygen from the ambient atmosphere could not enter the carboy but any $CO_2$ or $N_2$ produced during the incubation period could be evolved through the tygon tubing submerged in the water. The soil suspension was slowly mixed by placing the carboy on a magnetic stirrer. After two weeks an active microbial population was present.

It is thus seen that the process in accordance with this invention provides a unique and efficient way of disposing of high concentration nitrate waste as well as removing trace element contamination. It will be apparent to those skilled in the art that many variations may be made in the process of this invention. Such variations may include the use of different substrates or neutralizing bases. However, such variations are intended to be within the spirit and scope of the appended claims.

What is claimed is:

1. A process for removing nitrate ions from an aqueous waste stream having a nitrate concentration in excess of one kilogram nitrate per cubic meter, comprising the steps of:
   incubating under anaerobic conditions a culture of mixed denitrifying bacteria in the presence of a solution comprising at least 750 grams of nitrate per cubic meter and a biologically effective amount of a first carbon source to produce a culture of incubated mixed denitrifying bacteria;
   mixing said waste stream with a second source of carbon to form an influent solution;
   passing said influent solution vertically upward through a packed concially shaped column having as a packing material a support for denitrifying bacteria and having said incubated mixed denitrifying bacteria attached thereto; said conically shaped column having an upper diameter larger than its lower diameter;
   allowing said influent solution to contact said packing whereby said nitrate ions and said carbon source are converted to carbon dioxide and elemental nitrogen by the incubated denitrifying bacteria; and
   separating said elemental nitrogen from the influent solution.

2. The process according to claim 1 wherein said packing is selected from the group consisting of coal, polypropylene rings, ceramic rings, ceramic saddles, and polypropylene saddles.

3. The process according to claim 1 further including the step of maintaining the pH of said influent solution within the range of 6.4 to 7.0.

4. The process according to claim 1 wherein said waste stream further comprises heavy metal ions and said heavy metal ions are selected from the group consisting of uranium, cadmium, zinc, and plutonium and said heavy metal ions are retained within said column whereby the effluent streams of said column contains a substantially lower concentration of heavy metal ions and nitrogen than said influent stream.

5. The process according to claim 1 wherein said incubated culture is provided by anaerobically contacting soil having a pH from 6.5 to 7.5 and a carbon content of from 2 to 5 weight percent with said solution comprising at least 750 grams of nitrate per cubic meter and a biologically effective amount of said second carbon source, said soil containing a mixture of denitrifying bacteria.

6. The process according to claim 1 wherein said aqueous waste stream contains uranium ions and said uranium ions are retained within said column whereby the effluent streams of said column contain a substantially lower concentration of uranium ions than said influent stream.

7. The process of claim 1 in which said aqueous waste stream comprises nitrate waste from a $UO_2$ fuel fabrication plant and containing calcium, phosphorus, zinc, nickel, and cadmium ions; whereby calcium, phosphorous, zinc, nickel, and cadmium ions are retained within said column, causing the effluent streams of said column to contain a substantially lower concentration of said calcium, phosphorus, zinc, nickel, and cadmium ions than said influent stream.

8. The process of claim 7 in which said aqueous waste stream comprises 7-8 kilogram nitrate per cubic meter.

9. The process of claim 7 in which said incubated culture is provided by anaerobically contacting soil having a pH from 6.5 to 7.5 and a carbon content of from 2 to 5 weight percent with said solution comprising at least 750 grams of nitrate per cubic meter and a biologically effective amount of said second carbon source, said soil containing a mixture of denitrifying bacteria.

10. The process according to claim 1 wherein said packing is anthracite coal.

* * * * *